United States Patent

[11] 3,599,159

[72] Inventor Bobby A. Creech, Glendora; Erwin A. Hauck, Arcadia; Carl B. Carlson, Santa Barbara; and Iver C. Hansen, Arcadia, all of Calif.

[21] Appl No 27,190

[22] Filed Apr. 9, 1970

[45] Patented Aug. 10, 1971

[73] Assignee Burroughs Corporation, Detroit, Mich. Continuation-in-part of application Ser. No. 670,101, Sept. 25, 1967

[54] DIGITAL MEMORY WITH AUTOMATIC OVERWRITE PROTECTION

3 Claims, 1 Drawing Fig.

[52] U.S. Cl. .... 340/172.5

[51] Int. Cl. .... G05b 1/00

[50] Field of Search .... 340/172.5

[56] References Cited

UNITED STATES PATENTS

| | | | |
|---|---|---|---|
| 3,328,765 | 6/1967 | Amdahl | 340/172.5 |
| 3,351,913 | 11/1967 | Pine | 340/172.5 |
| 3,365,704 | 1/1968 | Ulrich | 340/172.5 |
| 3,398,405 | 8/1968 | Carlson | 340/172.5 |
| 3,405,394 | 10/1968 | Dirac | 340/172.5 |

*Primary Examiner* — Raulfe B. Zache
*Assistant Examiner* — Ronald F. Chapuran
*Attorneys* — Christie, Parker and Hale ABSTRACT: There is disclosed a digital computer in which words in memory may each have a special binary bit that is set to one, for example, to prevent that word from being changed. Whenever a particular command attempts to write a new word in memory, the special bit is sensed in the memory buffer on reading out the existing word at the start of the memory cycle, and, if the bit has been set to one the new word is rejected and the existing word is automatically restored in the same location in memory. The existing word in memory is also transmitted to the processor. The processor is interrupted by the presence of the special bit in the word transmitted from memory, indicating that a protected location in memory has been addressed.

PATENTED AUG 10 1971 3,599,159
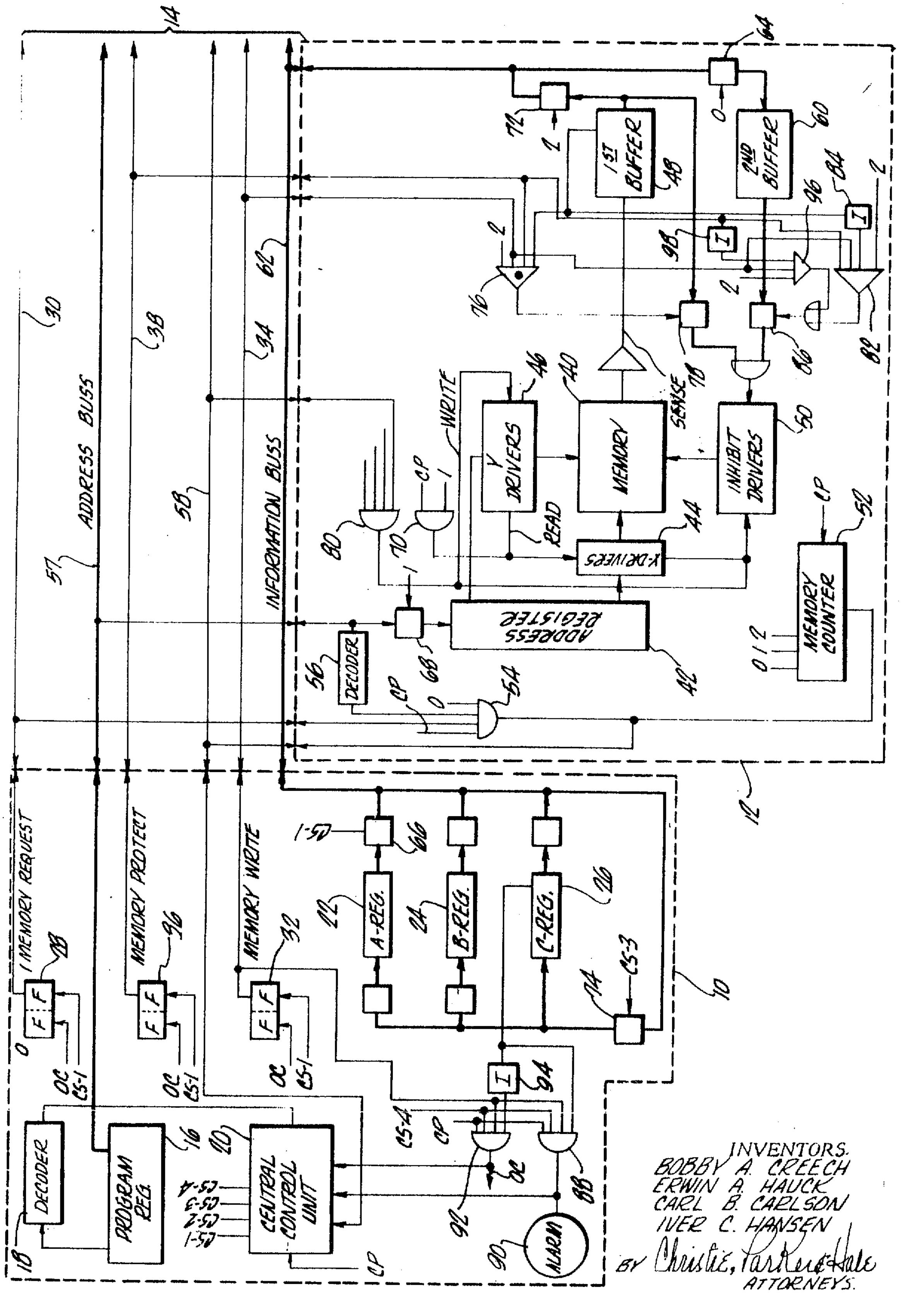
INVENTORS.
BOBBY A. CREECH
ERWIN A. HAUCK
CARL B. CARLSON
IVER C. HANSEN
BY Christie, Parker & Hale
ATTORNEYS.

CROSS REFERENCE TO RELATED APPLICATION

This is a continuation of copending application Ser. No. 670.101 filed September 25, 1967.

BACKGROUND OF THE INVENTION

In multi-program systems, there is a danger that a portion of memory set aside for one program may be invaded by another program. If, for example, one program attempts to store data in a memory location which already contains inviolable data for another program, it is possible that such an error may disrupt another program or even disrupt operation in the entire system. Normally, memory addresses are assigned in a manner to prevent the overwriting of one portion of memory assigned to one program by data from another program. However, addressing errors can and do occur and in fact may go undetected with sometimes serious consequences.

SUMMARY OF THE PRESENT INVENTION

The present invention is directed to a computer memory which incorporates a memory protect feature. The normal Store operation by a processor in which data is written into memory, as well as other instructions in which data is written into memory, by virtue of the present memory protect feature, can only write in those memory locations available to the program being processed.

This is accomplished by providing each word in memory with a special binary bit that can be set to one, for example, to indicate that the word is not to be modified or overwritten. The memory is provided with two buffer registers, one of which stores the new word to be written in memory and the other of which stores the existing word in memory which is initially read out of memory as part of the Write operation. After the memory is addressed and the existing word in memory is read out, it is tested to determine if the memeory bit is on. If the bit is on, the existing word is written back into memory as part of the same memory cycle. At the same time the existing word in memory is transferred to the processor where the presence of the memory protect bit signals an interrupt condition indicating that an inviolate portion of memory has been addressed.

DESCRIPTION OF THE DRAWINGS

For a more complete understanding of the invention, reference should be made to the accompanying drawing wherein the single figure is a schematic block diagram of a preferred embodiment of the invention.

DETAILED DESCRIPTION OF THE INVENTION

Referring to the drawing in detail, numeral 10 indicates generally a digital processor which communicates with one or more memory modules, one of which is indicated at 12, over an interconnecting cable indicated generally at 14. The processor may be of conventional configuration, in which program instructions are read out of memory and executed by the processor using data stored in the memory. Each instruction when brought out of memory and into the processor is placed in a program register 16. The Order portion of the instruction in the program register is then decoded by decoder 18. The output of the decoder 18 signals to the central control 20 of the processor the particular operation specified by the instruction in the program register 16. The central control 20, in synchronism with clock pulses CP, then executes the instruction utilizing, for example, operands stored in one or more registers, such as an A-register 22, B-register 24, and C-register 26. The operation of such processors in executing various arithmetic and logical commands is well known in the art.

While the memory protection feature of the present invention may form a part of the execution of a number of different instructions, in order to simplify the description and by way of example only, the preferred embodiment herein is described only in connection with execution of the Store instruction in which data words generated in the processor are transferred for storage to the memory. Assuming, therefore, that a Store instruction has been placed in the program register specifying that a Store operation is to take place and specifying the address in memory where a data word in the A-register 22, for example, is to be stored in memory, the central control unit 20 in response to the output of the decoder 18 advances through a series of control states in which the steps necessary to execute the Store instruction are performed. These control states in the processor are designated CS–1 through CS–4.

With the central control unit 20 initially in the CS–1 control state, a group of memory control flip-flops are set. One of these control flip-flops, indicated at 28, provides a Memory Request level on a Memory Request control line 30 of the cable 14 going to each of the memory modules 12. A second control flip-flop, indicated generally at 32, is set during the CS–1 state to provide an output level on a Memory Write control line 34 in the cable 14 going to each of the memory modules. A third control flip-flop, indicated generally at 36, establishes a Memory Protect level on a control line 38 of the cable 14 going to each of the memory modules. Thus each of the memory modules, such as the memory module 12, receives an indication during the CS–1 control state that communication with a memory module is requested, that a memory write operation is to take place, and that the memory protect feature is called for. These three control levels initiate a memory cycle in which a word in the A-register 22 is transferred to a selected address, as specified by the instruction in the program register 16, the word being then written into the addressed memory location if and only if that memory location has not previously been "locked" to prevent overwriting of the data in that memory location.

At this point it is necessary to consider the operation of the memory module 12. Each memory module includes a random access memory 40 which may be a coincident core memory or a thin film memory, both of which are well known in the art. The memory 40 is addressed in response to the contents of a memory address register 42, the output which selects one of a group of X-driver circuits 44 and one of a group of Y-driver circuits 46. Coincidence between the selected X-driver and Y-driver produces readout of the bits of a selected word in memory by means of suitable sense windings which read out the selected word and store it in a first buffer memory register 48. Because reading out information from the memory 40 destroys the information, the memory cycle includes a Write cycle in which the data is restored into memory 40 or is replaced by new data. During the Write portion of the memory cycle, the X-driver and the Y-driver are again actuated in response to the address information in the register 42. At the same time, the word to be written into memory is applied to Inhibit drivers 50 which set the selected bits in the specified location in the memory 40. Operation of the memory module 12 is under the control of a memory counter 52 which is synchronized with the clock pulses CP. The memory counter is advanced through a series of count conditions designated 0 through 3, by successive clock pulses.

When a memory request level is set by the processor 10 on a memory request line 30, memory counter 52 is advanced to the count state 1 by the output of a "logical and" circuit 54 in each of the memory modules. The "logical and" circuit senses that the memory request level has been set, that the memory counter is in the zero state indicating that the memory module is not in the process of performing a memory cycle, and also senses the presence of an address in the program register 16 by means of a decoder 56 connected to an Address buss 57 of the cable 14 coming from the program register 16. The output of the "logical and" circuit 54 sets the memory counter to the state 1 and also provides a signal on a Memory Ready control line 58 in the cable 14, signalling the central control unit 20 that the memory module is ready to execute a memory cycle.

One feature of the present invention is that each memory module is provided with two information buffer registers. In addition to the first buffer register 48, there is provided a second buffer register 60. Second buffer register 60 is coupled to an Information buss, indicated at 62 in the cable 14, through an "and" gate 64. The Information buss 62 provides two-way communication between the processor 10 and the information module 12.

For the Store operation, the contents of the A-register 22 are coupled to the Information buss 62 at the processor 10 through an "and" gate 66 to which is applied the CS-1 state from the central control 20. Since the 0 state of the memory counter 52 is applied to the gate 64, the contents of the A-register 22 are placed in the second buffer 60 at the start of the Store operation. The memory unit 12 now proceeds through the complete memory cycle.

To this end, when the memory counter 52 advances to the 1 state, the address in the program register 16 is transferred over the address buss 57 to an "and" gate 68 in the memory module 12 to which the 1 state in the memory counter is also applied. The clock pulse at the end of the 1 state is applied by means of a "logical and" circuit 70 to the X-drivers 44 and Y-drivers 46 to read out the contents of the selected memory location into the first information buffer 48.

With the selected word in memory 40 now placed in the first buffer 48, the memory counter advances to the 2 state. During the 2 state, an "and" gate 72 gates the contents of the first buffer 48 to the information buss 62. In the processor, an "and" gate 74 couples the information buss to the input of the C register 26 in response to the CS-3 control level from the central control unit 20. Thus on a normal Store operation, the prior word in memory 40 is automatically made available in the processor.

At the same time, one bit in the word in the first buffer 48 is tested. This bit is a flag bit for the Memory Protect operation and signals that the word in memory is protected and should not be overwritten. The condition of this bit is applied to a "logical and" circuit 76 together with the control signal on the Memory Protect line 38 as well as the 2 state from the memory counter 52. If the output of the "logical and" circuit 76 is true, it indicates that the word in memory is not to be overwritten by the storage of the new word and that the old word in the first buffer 48 should be restored into the memory 40. To this end, the output of the "logical and" circuit 76 is applied to an "and" gate 78 which couples the output of the first buffer 48 to the inhibit driver 50. The clock pulse at the end of the 2 state of the memory counter 52 is applied to a "logical and" circuit 80 to the X-drivers 44 and Y-drivers 46 for writing the contents of the first buffer 48 back into the addressed location in the memory 40, thereby restoring the same data back in memory.

If, on the other hand, the area in memory has not been "locked" by the setting of the memory protect bit, the word in the second buffer 60 is written into the memory 40 rather than the content of the first buffer 48. This is accomplished by a "logical and" circuit 82 to which the Memory Protect level from the control line 38 is applied together with the 2 state of the memory counter 52 and the memory protect bit of the word in the first buffer 48. The memory protect bit is applied through an inverter 84 so that the output of the "and" circuit 82 is true only if the protect bit has not been set in the word in the first buffer 48. The output of the "logical and" circuit 82 is applied to an "and" gate 86 which couples the output of the second buffer register 60 to the inhibit drivers 50 to write the new word into the memory 40. This completes storage of the new word in the memory 40.

However, the previously stored word which has now been made available to the processor in the C register 26 provides a means of signalling the processor that there was an improper attempt to overwrite a protected area in memory. To this end, the protect bit in the word in the C register 26 is applied to a "logical and" circuit 88 together with the next clock pulse CP in the CS-4 state of the central control 20. Assuming the protect bit has been set in the word in the C register, the output of the "and" circuit 88 is true. This provides an Interrupt signal to the central control unit 20 causing the central control unit to branch to a fixup routine. The output of the "and" circuit 88 may also be applied to a suitable alarm 90, indicating that through some error the processor has attempted to overwrite a protected area in the addressed memory.

If the memory protect bit is not set in the C register 26, this is sensed by a "logical and" circuit 92 to which the memory protect bit level is applied through an inverter 94 together with the next clock pulse in the CS-4 state of the central control unit 20. The output of the "logical and" circuit 92 provides an Operation Complete pulse (OC). This pulse resets the control flip-flops 28, 32 and 36 and resets the central control unit 20 to initiate a fetch operation of the next instruction.

From the above description it will be recognized that the present invention provides improved communication between a processor and a memory module. In particular, there is provided a means of protecting the memory against overwriting of a word in memory which normally should not be overwritten. The protect bit in any word in memory can be set at the time the word is stored in memory. Thus, such areas as those storing program instructions, a master control program, tables and the like can be protected against inadvertent invasion by any program during its execution. A special command can be provided by which even protected information can be overwritten and would be similar in execution to the normal Store command described above except that the memory protect control flip-flop 36 would not be set. In this case the word in the second buffer 60 would be written into memory. A "logical and" circuit 96 in the memory module 12 senses the Memory Write line 34 is true, that the Memory Protect is not true (via inverter 98), and the 2 state of the memory counter 52. The output of the "logical and" circuit 96 is applied to the gate 86 to gate the contents of the second buffer 60 to the inhibit drivers 50.

By providing two buffer registers in each of the memory modules, the memory protect bit can be tested during the memory cycle, and a decision made as to whether the old word will be restored in memory or a new word will be written in memory. The two buffers have the additional advantage that a single information buss can be used for communicating in both directions between the processor and the memory unit. During a normal memory write operation, the existing word in the address portion of the memory can be sent back to the processor during the memory cycle. By making the old word available in the processor before the completion of the memory cycle, the processor can be made to test the condition of the old word and take action without interruption of the normal memory cycle.

What is claimed is:

1. In a data processing system having a processor and a plurality of addressable storage units in which binary coded information is transferred between the processor and each of the storage units over a common information buss, apparatus comprising, in each storage unit, addressable memory means, an address register for addressing any selected location in the memory means, first and second buffer registers, and control means for sequencing a memory cycle in response to a signal from the processor, and the processor including means for coupling a binary coded address signal to the storage units, means transferring a word to the second buffer register in the storage units over the common information buss and signaling a particular storage unit to initiate a memory cycle, said control means in the particular storage unit including means responsive to the signal initiating the memory cycle and the address signal for reading out a word from the address location in the memory means to the first buffer register, means for writing the word in the second buffer into the same address location in the memory means, and means transferring the word in the first buffer register by the common information buss to the processor.

2. Apparatus as defined in claim 1 wherein the storage unit further includes means for sensing the condition of at least one binary bit in the word in the first buffer register and means responsive to said sensing means for inhibiting said means from writing the word in the second buffer register into the memory means when said bit is in a first state, said last names means including means for transferring the word in the first buffer register back into the memory means when said bit is in the first state.

3. Apparatus as defined in claim 1 further including a register in the processor for receiving the word transferred from the first buffer register in the storage unit, means in the processor for sensing said one binary bit stored in the register, and means responsive to said sensing means for indicating an error condition when the bit is in said first state.